US012700758B2

(12) United States Patent
Mccool et al.

(10) Patent No.: US 12,700,758 B2
(45) Date of Patent: Aug. 4, 2026

(54) SYSTEMS AND METHODS FOR DYNAMIC ROADWAY CHARGING

(71) Applicant: HEVO, INC., Brooklyn, NY (US)

(72) Inventors: Jeremy Mccool, Brooklyn, NY (US); Umer Anwer, Brooklyn, NY (US); Kerim Colak, Brooklyn, NY (US); Kunal Kamle, Brooklyn, NY (US); Luke Mansfield, Brooklyn, NY (US)

(73) Assignee: HEVO, INC., Brooklyn, NY (US)

( * ) Notice: Subject to any disclaimer, the term of this patent is extended or adjusted under 35 U.S.C. 154(b) by 762 days.

(21) Appl. No.: 18/047,144

(22) Filed: Oct. 17, 2022

(65) Prior Publication Data

US 2023/0122088 A1 Apr. 20, 2023

Related U.S. Application Data

(60) Provisional application No. 63/257,060, filed on Oct. 18, 2021.

(51) Int. Cl.
*H02J 50/40* (2016.01)
*B60L 53/12* (2019.01)
(Continued)

(52) U.S. Cl.
CPC .............. *H02J 50/40* (2016.02); *B60L 53/12* (2019.02); *H02J 3/322* (2020.01); *H02J 7/855* (2026.01);
(Continued)

(58) Field of Classification Search
CPC .......... B60L 53/53; B60L 53/12; B60L 53/66; B60L 53/665; B60L 53/57; B60L 53/122;
(Continued)

(56) References Cited

U.S. PATENT DOCUMENTS 5,207,304 A * 5/1993 Lechner .................... B60L 9/00
191/10
5,311,973 A * 5/1994 Tseng ...................... H02J 50/70
320/108
(Continued)

FOREIGN PATENT DOCUMENTS

GB 2496436 A * 5/2013 ............. H01F 38/14
JP 2017085888 A * 5/2017 ............. B60L 53/51
(Continued)

OTHER PUBLICATIONS

International Search Report issued in International Application No. PCT/US2022/078227 dated Jan. 23, 2023 (14 pages).

*Primary Examiner* — Jared Fureman
(74) *Attorney, Agent, or Firm* — Bookoff McAndrews, PLLC

(57) ABSTRACT

A wireless charging system that includes a plurality of wireless charging pads positioned along a roadway. Each of the wireless charging pads define a transmitter configured to wirelessly transfer electrical power to a receiver of one or more electric vehicles as the electric vehicles are in motion relative to the roadway. The system includes a power station disposed adjacent to the roadway, and communicatively coupled to the wireless charging pads. The power station defines an inverter configured to transfer electrical power to the wireless charging pads from a power source. The wireless charging pads are collectively configured to wirelessly charge the electric vehicles in response to the electric vehicles moving along the roadway, such that the receiver of the electric vehicles continuously receives the electrical power from the wireless charging pads as the electric vehicle moves on the roadway.

19 Claims, 5 Drawing Sheets

(51) Int. Cl.

| | | |
|---|---|---|
| *H02J 3/32* | (2026.01) | |
| *H02J 7/00* | (2026.01) | |
| *H02J 50/10* | (2016.01) | |
| *H02J 50/90* | (2016.01) | |

(52) U.S. Cl.
CPC .............. *H02J 7/865* (2026.01); *H02J 50/10* (2016.02); *H02J 50/90* (2016.02)

(58) Field of Classification Search
CPC ...... B60L 53/126; B60L 53/62; B60L 53/305; B60L 53/51; H02J 50/40; H02J 3/322; H02J 7/0063; H02J 7/0068; H02J 50/10; H02J 50/90
See application file for complete search history.

(56) References Cited

U.S. PATENT DOCUMENTS

| | | | | |
|---|---|---|---|---|
| 5,669,470 | A * | 9/1997 | Ross | B60L 53/126 320/109 |
| 8,030,888 | B2 * | 10/2011 | Pandya | H02J 50/12 320/108 |
| 8,963,481 | B2 * | 2/2015 | Prosser | B60L 53/00 320/105 |
| 9,511,674 | B2 * | 12/2016 | Keeling | H02J 50/12 |
| 9,731,614 | B1 * | 8/2017 | Sarwat | B60L 53/12 |
| 9,964,415 | B2 * | 5/2018 | Ricci | G01C 21/3673 |
| 10,183,584 | B2 * | 1/2019 | Ricci | B60L 53/32 |
| 10,727,693 | B2 * | 7/2020 | Wang | H02J 50/402 |
| 10,759,281 | B2 * | 9/2020 | Miller | H02J 7/1438 |
| 10,868,447 | B2 * | 12/2020 | Lin | H02J 50/90 |
| 11,059,380 | B2 * | 7/2021 | Wang | B60L 5/005 |
| 11,535,111 | B2 * | 12/2022 | De Blasio | B60L 53/305 |
| 11,652,367 | B2 * | 5/2023 | Boys | B60L 53/126 307/104 |
| 11,920,309 | B2 * | 3/2024 | Botts | H02N 2/186 |
| 11,984,735 | B2 * | 5/2024 | Sumiya | B60L 53/122 |
| 12,049,151 | B2 * | 7/2024 | Wang | B60L 53/53 |
| 12,068,619 | B2 * | 8/2024 | Nakayashiki | H02J 50/502 |
| 12,194,875 | B2 * | 1/2025 | Zhang | B60L 53/11 |
| 2010/0181957 | A1 * | 7/2010 | Goeltner | B60L 53/64 320/101 |
| 2012/0161530 | A1 * | 6/2012 | Urano | H02J 50/90 307/104 |
| 2012/0293109 | A1 * | 11/2012 | Glazer | H02J 7/28 290/55 |
| 2013/0049674 | A1 * | 2/2013 | Davis | B60L 53/54 320/101 |
| 2015/0324798 | A1 * | 11/2015 | Kai | G06Q 20/145 705/40 |
| 2015/0364944 | A1 | 12/2015 | Briz et al. | |
| 2016/0023557 | A1 * | 1/2016 | Dimke | B60L 53/36 320/108 |
| 2017/0136888 | A1 | 5/2017 | Ricci | |
| 2018/0375376 | A1 * | 12/2018 | Kanno | B60L 53/53 |
| 2021/0203271 | A1 * | 7/2021 | Xu | H02S 40/36 |
| 2024/0300351 | A1 * | 9/2024 | Stumpf | B60L 53/50 |
| 2024/0424922 | A1 * | 12/2024 | Obayashi | H02J 50/80 |

FOREIGN PATENT DOCUMENTS

| | | | | | |
|---|---|---|---|---|---|
| WO | WO-2015160512 | A2 * | 10/2015 | ......... | H02J 7/00304 |
| WO | WO-2016039644 | A2 * | 3/2016 | ............ | H02J 50/005 |

* cited by examiner

SYSTEMS AND METHODS FOR DYNAMIC ROADWAY CHARGING

CROSS-REFERENCE TO RELATED APPLICATION(S)

This patent application claims the benefit of priority to U.S. Provisional Patent Application No. 63/257,060, filed on Oct. 18, 2021, which is hereby incorporated by reference in its entirety.

FIELD

The present invention is generally in the field of electric vehicle charging, and relates to the systems, hardware, and network for implementing wireless charging zones for electric vehicles along a travel path (e.g., a roadway) while the electric vehicles are in motion.

BACKGROUND

Commercial and personal transportation are currently dependent on fossil fuels. Use of fossil fuels, however, has become increasingly problematic. Rising costs, pollution, safety, and many countries' dependence on foreign sources of fossil fuels have lead consumers to seek alternatives to traditional fuel-powered vehicles. One alternative to traditional gasoline-powered vehicles is electrically powered vehicles and electric/fuel hybrid vehicles. Electric vehicles utilize one or more electrical motors for propulsion, typically powered by batteries. The batteries can be charged by one or more sources of electricity, including fossil fuels, nuclear power, and renewable sources such as solar power and wind power.

Electric vehicles typically must be plugged in to a specially-designed outlet to receive power for charging the batteries, or electric vehicles can be wirelessly charged at a charging station. In existing wireless charging stations, the electric vehicle is required to be parked at a designated location of the charging station for a minimum duration to charge the battery of the electric vehicle, which may generally require greater time than that required for fueling traditional gasoline-powered vehicles. During such prolonged durations, electric vehicles may be rendered inoperable for use (e.g., travel) until the battery receives the necessary electric charge to facilitate further operation (e.g., movement) of the electric vehicle. In view of the foregoing, there is a need for improvements and/or alternative or additional solutions to provide wireless charging of electric vehicles that overcome drawbacks of existing solutions.

SUMMARY

The present disclosure describes devices, systems and methods for wireless roadway charging of electric vehicles. In some aspects, a wireless charging system can include a plurality of wireless charging pads positioned along a roadway. Each of the plurality of wireless charging pads define a transmitter that can wirelessly transfer electrical power to a receiver of one or more electric vehicles, as the one or more electric vehicles are in motion relative to the roadway. The wireless charging system can include a power station disposed adjacent to the roadway, and communicatively coupled to each of the plurality of wireless charging pads, wherein the power station defines an inverter that is configured to transfer electrical power to the plurality of wireless charging pads from a power source, wherein the plurality of wireless charging pads are collectively configured to wirelessly charge the one or more electric vehicles in response to the one or more electric vehicles moving along the roadway, such that the receivers of the one or more electric vehicles continuously receive the electrical power from the plurality of wireless charging pads as the electric vehicle moves on the roadway.

In additional or alternative aspects, a wireless charging system can include a first wireless charging pad positioned along a roadway, the wireless charging pad configured to wirelessly transfer a first portion of electrical power to a receiver of a vehicle while the vehicle is in motion on the roadway and positioned adjacent to the first wireless charging pad. The wireless charging system can include a first rechargeable battery positioned adjacent to the roadway, the first rechargeable battery is electrically coupled to the first wireless charging pad, and the wireless charging system including a charging depot positioned adjacent to the roadway, the charging depot is electrically coupled to the first rechargeable battery, wherein the charging depot is configured to receive the first portion of electrical power from a power source and transfer the first portion of electrical power to the first rechargeable battery, and the first rechargeable battery is configured to transfer the first portion of electrical power to the first wireless charging pad in response to the vehicle moving on the roadway and the receiver being positioned adjacent to the first wireless charging pad.

In additional or alternative aspects, a method for wirelessly charging a vehicle includes wirelessly transferring, using a plurality of wireless charging pads positioned in alignment relative to one another along a roadway, electrical power towards a receiver of the vehicle while the vehicle is in motion along the roadway and when the receiver is positioned proximate to one or more of the plurality of wireless charging pads, and wirelessly charging, using the plurality of wireless charging pads, one or more of the plurality of wireless charging pads with electrical power from one or more adjacent wireless charging pads when an electrical charge of the one or more wireless charging pads is relatively lower than the electrical charge of the one or more adjacent wireless charging pads.

The details of one or more aspects and examples are set forth in the accompanying drawings and the description below. Other features and aspects will become apparent from the description, the drawings and the claims.

BRIEF DESCRIPTION OF THE DRAWINGS

The accompanying drawings are incorporated in and constitute a part of the specification. The drawings, together with the general description given above and the detailed description of the exemplary embodiments and methods given below, serve to explain the principles of the invention. In such drawings.

Figure 1:
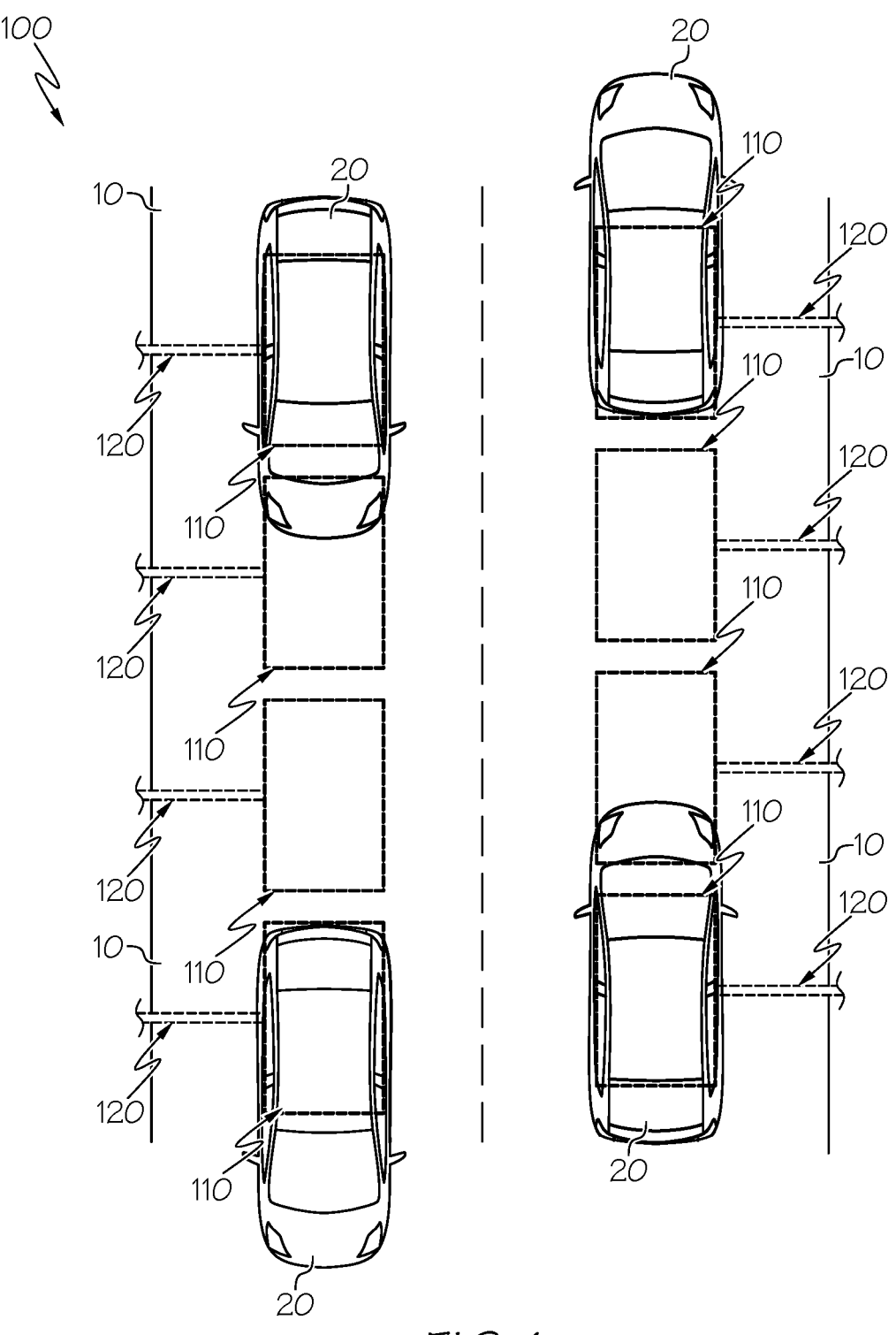
FIG. 1 is a schematic of an exemplary wireless charging system including a dynamic wireless charging travel lane.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.).

As used herein, the term "and/or" includes any and all combinations of one or more of the associated listed items. The terms first, second, third, etc. may be used herein to describe various elements, components, regions, layers and/ or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations. In the discussion that follows, terms "about," "approximately," "substantially," and the like, when used in describing a numerical value, denote a variation of +/−10% of that value, unless specified otherwise.

Referring to FIG. 1, an exemplary wireless charging system 100 is depicted. Wireless charging system 100 (hereinafter "system 100") may include one or more wireless charging travel lanes 10 having one or more wireless charging pad assemblies 110 and one or more electric utility lines 120 coupled thereto. For example, system 100 may include an adjacent pair of wireless charging travel lanes 10, each of which may include a plurality of charging pad assemblies 110 and a plurality of utility lines 120. It should be appreciated that wireless charging travel lanes 10 may define an improved ground surface specially prepared for use by motorized vehicles for the conveyance of traffic. By way of illustrative example, wireless charging travel lanes 10 may include a roadway, a highway, and/or various other suitable transportation surfaces for facilitating movement of motorized vehicles.

It should be understood that system 100 may be integrated and/or incorporated in various suitable locations. For example, system 100, and specifically wireless charging travel lanes 10, may be located in designated areas along existing roadways, highways, city roads, residential roads, and more. Although wireless charging travel lanes 10 may be incorporated along any road surface, placement of system 100 may be optimized to support and promote electric charging access in specific high-density zones, such as high-traffic thoroughfares, commercial vehicle lanes, and more.

Still referring to FIG. 1, the plurality of wireless charging pad assemblies 110 may be positioned in a predefined arrangement (e.g., linear, lateral, etc.) along a longitudinal length of each wireless charging travel lane 10. System 100 may include at least one electric utility line 120 electrically coupled to each of the plurality of charging pad assemblies 110, and electric utility lines 120 may be configured to transmit electrical power, such as an Alternating Current (AC), from a power source to charging pad assembly 110. In some embodiments, charging pad assemblies 110 and/or electric utility lines 120 may be positioned flush along an exterior surface of wireless charging travel lane 10. In other embodiments, charging pad assemblies 110 and/or electric utility lines 120 may be disposed beneath the exterior surface of wireless charging travel lane 10. In further embodiments, charging pad assemblies 110 and/or electric utility lines 120 may be positioned adjacent to wireless charging travel lane 10, such as along a shoulder of a roadway.

Figure 3:
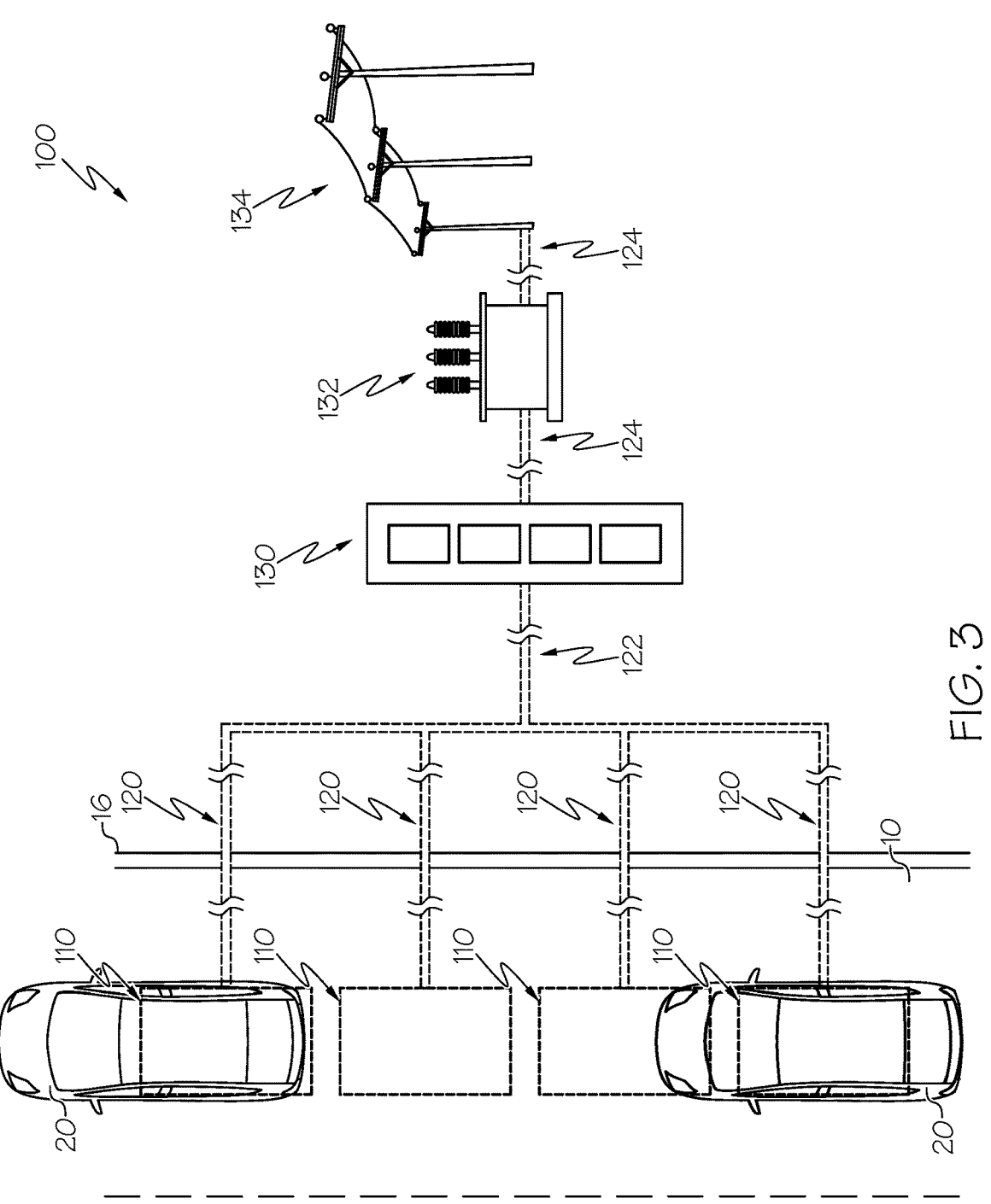
FIG. 3 is a schematic view of an embodiment of exemplary use of the wireless charging system of FIG. 1 communicatively coupled to an electrical transmission system.
Figure 4:
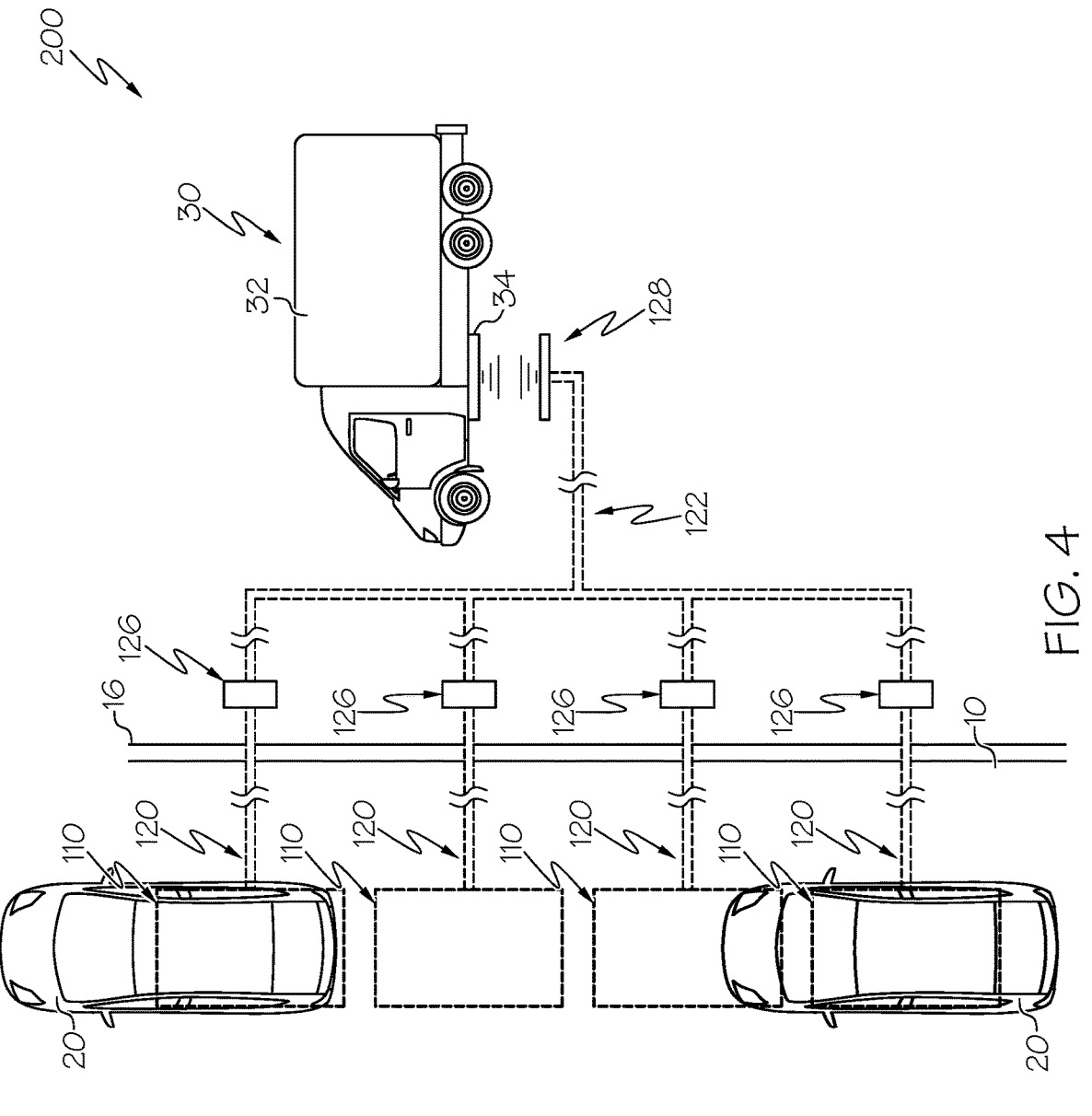
FIG. 4 is a schematic view of another embodiment of exemplary use of an exemplary wireless charging system communicatively coupled to a mobile charging station.
Figure 5:
FIG. 5 is a schematic view of another embodiment of exemplary use of an exemplary wireless charging system communicatively coupled to a mobile charging station, with the wireless charging system having bi-directional charging capabilities.

As described in detail herein, electric utility lines 120 may include a power cable and/or conduit that is configured and operable to interconnect (e.g., electrically couple) charging pad assemblies 110 to one or more electrical systems and/or devices, such as, for example, a power source (see FIGS. 3-5). By way of illustrative example only, electric utility lines 120 may have various suitable electrical outputs, including but not limited to, an electrical output ranging from about 180 KW (kilowatts of electricity output per hour) to about 220 KW, such as about 200 KW. It should be appreciated that the electrical output values described herein are merely exemplary such that other suitable electrical outputs may be included without departing from a scope of this disclosure.

Still referring to FIG. 1, wireless charging system 100 may be configured to electrically charge one or more electric vehicles 20 wirelessly as the one or more electric vehicles 20 travel (e.g., move, drive) along wireless charging travel lanes 10. In some embodiments, each of the plurality of wireless charging pad assemblies 110 may be positioned within a maximum offset distance relative to one another along wireless charging travel lane 10, such that the plurality of wireless charging pad assemblies 110 may be in close proximity to one another. In this instance, system 100, and particularly the plurality of wireless charging pad assemblies 110, may be configured to continuously transfer electrical power to one or more electric vehicles 20 when said electric vehicles 20 are positioned directly over and/or adjacent to (e.g., between) one or more wireless charging pad assemblies 110.

Wireless charging pad assemblies 110 are described herein as transferring electrical power to electric vehicles 20. It should be appreciated that the term "transfer" may include, but is not limited to, transmitting, emitting, delivering, relaying, releasing, generating, and/or projecting an electrical current. In some embodiments, system 100, and particularly wireless charging pad assemblies 110, may be configured to wirelessly charge electric vehicles 20 through various suitable methods, such as induction charging, magnetic resonance charging, and more. It should be appreciated that wireless charging travel lanes 10 may be utilized by electric vehicles 20 and non-electric vehicles (not shown), such that electric vehicles 20 may receive electric charge while traveling along wireless charging travel lanes 10 and non-electric vehicles may not experience any electric charge while traveling on wireless charging travel lanes 10.

In an exemplary implementation, electric vehicle 20 may include a motorized vehicle that may travel along wireless charging travel lane 10 to recharge a battery of said electric vehicle 20 while driving, thereby extending a travel range of electric vehicle 20. In some embodiments, in which electric vehicle 20 may include one or more secondary electric devices onboard (e.g., a delivery truck), wireless charging travel lane 10 may be operable to charge said secondary electric devices (e.g., a refrigerator, a cooler, a computer, etc.), in addition to electric vehicle 20, which may be similarly powered by one or more batteries of electric vehicle 20.

Figure 2:
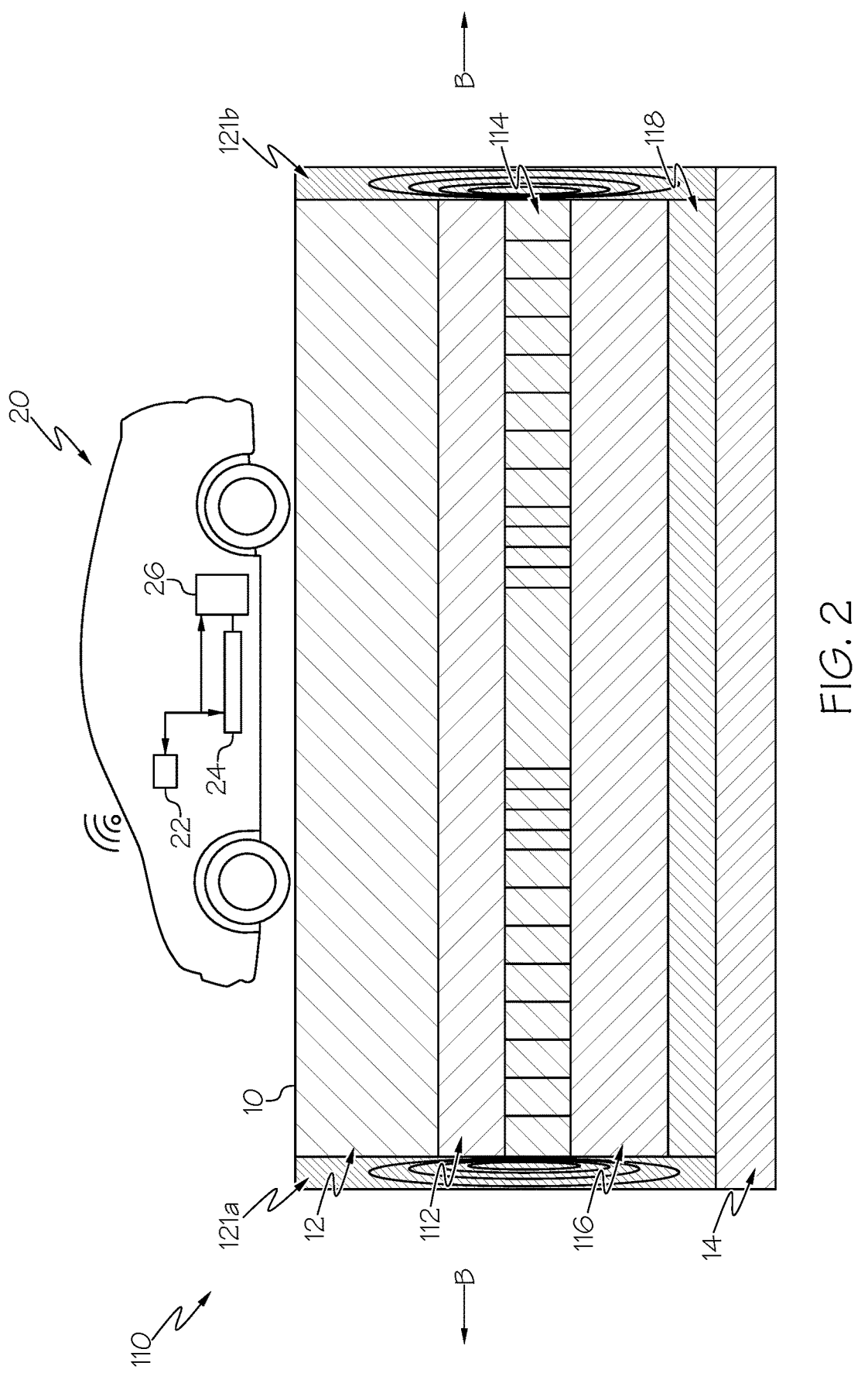
FIG. 2 is a cross-section of the dynamic wireless charging travel lane of FIG. 1.

FIG. 2 depicts electric vehicle 20 positioned above wireless charging pad assembly 110 as electric vehicle 20 drives along wireless charging travel lane 10. In some embodiments, electric vehicle 20 may include a control unit 22, a charging receiver 24, and a rechargeable battery 26 electrically coupled to one another. Control unit 22 may include a controller and/or various other suitable devices for controlling an operation of electric vehicle 20, and particularly of charging receiver 24 and/or rechargeable battery 26. As described herein, control unit 22 may be configured to control an electrical connection of electric vehicle 20 with system 100, a rate of power transfer received at charging receiver 24, monitor properties of rechargeable battery 26 (e.g., a charge level, a charge rate, a temperature, a usage efficiency, etc.), and more.

For example, control unit 22 may include an electronic, a mechanical, and/or an electromechanical component that is configured and operable to perform various control, analytical, and/or communication functions. In some embodiments, control unit 22 may include a processor, a memory, a user interface (e.g., a display), and/or one or more actuators (e.g., buttons, dials, knobs, etc.). Although control unit 22 is shown and described herein as a single unit, it should be appreciated that control unit 22 may include a plurality of units communicatively coupled to one another and collectively configured to perform various functions.

Charging receiver 24 may include a device or system configured and operable to wirelessly receive electrical power from system 100 through various suitable methods, such as, for example, via induction or magnetic resonance, electromagnetic radiation, and more. In some embodiments, charging receiver 24 may include a power converter, a rectifier, and/or one or more coils having various configurations, sizes, orientations, loop quantities and/or diameters, etc. Charging receiver 24 may be configured to charge rechargeable battery 26 at relatively fast speeds and relatively high voltages and/or currents. As described in detail herein, charging receiver 24 may be configured to wirelessly receive electric power from system 100, and particularly one or more of the plurality of charging pad assemblies 110, as electric vehicle 20 moves along wireless charging travel lane(s) 10.

Still referring to FIG. 2, rechargeable battery 26 may include one or more batteries that may be configured and operable to store electrical power received from system 100, such as via charging receiver 24. Rechargeable battery 26 may be electrically coupled to charging receiver 24, which may be communicatively coupled to control unit 22. In some embodiments, control unit 22 may be operable to convert and/or modify electrical power received from system 100 at charging receiver 24, and supply rechargeable battery 26 with said electrical power at one or more parameters (e.g., at a suitable amount, current, frequency, etc.). Control unit 22 may be configured to selectively transmit the electrical power received at charging receiver 24 to one or more components of electric vehicle 20, including an electric motor (not shown) for operating electric vehicle 20, one or more electric devices (not shown) of electric vehicle 20, and rechargeable battery 26, such as when rechargeable battery 26 includes available storage capacity.

Wireless charging pad assembly 110 may include one or more components or layers integrated into wireless charging travel lane 10. In the example, the one or more components or layers of wireless charging pad assembly 110 may be disposed between an outer ground layer 12 and an inner ground layer 14 of wireless charging travel lane 10. Outer ground layer 12 may define a roadway surface formed of various suitable materials, including, for example, concrete, asphalt, pavement, resin, or any other material suitable for road surfaces of motorized vehicles. In some embodiments, outer ground layer 12 may have a thickness ranging from about 2 inches to 6 inches, such as 4 inches. Inner ground layer 14 may be a natural ground surface disposed relatively beneath outer ground layer 12.

Still referring to FIG. 2, wireless charging pad assembly 110 may be disposed between outer ground layer 12 and inner ground layer 14. In some embodiments, wireless charging pad assembly 110 may have a length of about 2 meters and a width of about 1 meter. Wireless charging pad assembly 110 may include at least one cabling layer 112, at least one magnetic layer 114, at least one power electronics layer 116, and at least one cooling layer 118 disposed between outer ground layer 12 and inner ground layer 14. Further, wireless charging pad assembly 110 may include at least one first end wall 121*a* and at least one second end wall 121*b* disposed at opposing ends of the at least one cabling layer 112, the at least one magnetic layer 114, the at least one power electronics layer 116, and the at least one cooling layer 118.

The at least one cabling layer 112 may be positioned directly beneath outer ground layer 12 and above the at least one magnetic layer 114. In the example, charging pad assembly 110 may include one cabling layer 112, and cabling layer 112 may include one or more cables and/or wires that are configured and operable to carry (e.g., transmit) electrical current at high frequencies. Cabling layer 112 may define a transmitter of wireless charging pad assembly 110 that is operable to wirelessly transmit electrical power towards the plurality of electric vehicles 20 positioned along wireless charging travel lane(s) 10. Cabling layer 112 may include various configurations of one or more coils having different sizes, orientations, and/or loop quantities or diameters, as described above with respect to charging receiver 24 of electric vehicle 20.

In some embodiments, cabling layer 112 may include a Litz multistrand-wire assembly that is configured to carry an electromagnetic (EM) Alternating Current (AC) signal at radio frequencies. In other embodiments, cabling layer 112 may include a foil and/or other suitable material for carrying an electrical current between one or more layers and/or electrical devices, such as charging receiver 24. Wireless charging pad assembly 110 may be formed of various suitable materials for transmitting electrical power through outer ground layer 12 and towards charging receiver 24 (from cabling layer 112), such as, for example, via induction or magnetic resonance, electromagnetic radiation, and more.

Still referring to FIG. 2, the at least one magnetic layer 114 may be positioned directly beneath the at least one cabling layer 112 and above the at least one power electronics layer 116. In the example, wireless charging pad assembly 110 may include one magnetic layer 114, and magnetic layer 114 may be formed of a material having a relatively high magnetic permeability. Magnetic layer 114 may be configured and operable to define a protective shield between cabling layer 112 and one or more of the at least one power electronics layer 116, the at least one cooling layer 118, and inner ground layer 14. In some embodiments, magnetic layer 114 may be formed of a hard and/or a soft ferromagnetic material, such as ferrite. Magnetic layer 114 may be configured to capture any stray magnetic flux, such as that generated at cabling layer 112, and at least partially inhibit the magnetic flux from leaking down towards power electronics layer 116, cooling layer 118, and/or inner ground layer 14. Stated differently, magnetic layer 114 may be operable to minimize harmful emissions of electrical voltage to the surrounding environment of wireless charging travel lane 10. In some embodiments, magnetic layer 114 may be magnetized (i.e., attracted to a magnet), and may be electrically nonconductive. In other embodiments, magnetic layer 114 may be formed of a material suitable for high charging efficiency.

Still referring to FIG. 2, the at least one power electronics layer 116 may be positioned directly beneath the at least one magnetic layer 114 and above the at least one cooling layer 118. In the example, wireless charging pad assembly 110 may include one power electronics layer 116, and power electronics layer 116 may include one or more electronic components of wireless charging pad assembly 110. For example, power electronics layer 116 may include one or more electronic components operable to facilitate and/or perform one or more operations, functionalities, and/or processes of wireless charging pad assembly 110, including but not limited to, receiving, storing, and/or transmitting wireless electrical power to and/or from wireless charging pad assembly 110.

The at least one cooling layer 118 may be positioned directly beneath the at least one power electronics layer 116 and above inner ground layer 14. In the example, wireless charging pad assembly 110 may include one cooling layer 118, and cooling layer 118 may be configured to transfer heat generated at wireless charging pad assembly 110 to a fluid stored within cooling layer 118. For example, cabling layer 112 may experience high heat loads during use of wireless charging pad assembly 110 to electrically charge electric vehicle(s) 20 traveling along charging travel lane(s) 10. In this instance, cooling layer 118 may be operable to absorb the heat generated at cabling layer 112, thereby inhibiting cabling layer 112 from exceeding a suitable operating temperature. In some embodiments, cooling layer 118 may include a liquid-cooling plate that stores a liquid therein, such as an ethylene glycol and water (EGW) solution, a propylene glycol and water (PGW) solution, and more. In other embodiments, cooling layer 118 may include various other suitable devices, including but not limited to, a heat exchanger, a radiator, and/or other suitable systems for reducing a thermal load on an electrical system, such as the one or more components of power electronics layer 116.

As shown in FIG. 2, the individual layers or elements of wireless charging pad assembly 110 may be arranged in a layered, stacked configuration, with cabling layer 112 disposed adjacent outer ground layer 12, magnetic layer 114 disposed adjacent to cabling layer 112, power electronics layer 116 disposed adjacent to magnetic layer 114, cooling layer 118 disposed adjacent to power electronics layer 116, and power electronics layer 116 disposed adjacent inner ground layer 14. As such, cabling layer 112 may define an uppermost layer of wireless charging pad assembly 110, and cooling layer 118 may define a bottommost layer of wireless charging pad assembly 110. It should be appreciated that the elements of wireless charging pad assembly 110 may be arranged in various other suitable configurations relative to one another and/or to ground layers 12, 14 without departing from a scope of this disclosure.

End walls 121a, 121b may each have a longitudinal length that extends relatively downward from outer ground layer 12 and towards inner ground layer 14, such that each of cabling layer 112, magnetic layer 114, power electronics layer 116, and cooling layer 118 may be disposed (laterally) between end walls 121a, 121b. End walls 121a, 121b may include, for example, a metal, a metal alloy, and/or various other suitable materials for permitting transmission of wireless electrical power from wireless charging pad assembly 110 therethrough. In some embodiments, end walls 121a, 121b may be configured to provide bi-directional charging in a radially-outward direction B relative to end walls 121a, 121b. Stated differently, the bi-directional charging direction B may radiate laterally away from end walls 121a, 121b, such as outward from wireless charging pad assembly 110. As described herein, the bi-directional charging of end walls 121a, 121b may facilitate charging one or more wireless charging pad assemblies 110 that may be positioned adjacent to one another (see FIG. 5).

In exemplary use of system 100, as shown in FIG. 3, a plurality of wireless charging pad assemblies 110 may be positioned along a roadway, and particularly within a surface of wireless charging travel lane 10. It should be appreciated that the roadway may include one or more wireless charging travel lanes 10 and/or one or more non-wireless charging travel lanes 11. The roadway may further include a shoulder 16 that at least partially defines a boundary of wireless charging travel lane 10. As described herein, one or more components and/or devices of system 100 may be positioned adjacent to shoulder 16 and outside of wireless charging travel lane 10.

System 100 may be configured and operable such that wireless charging pad assembly 110 may wirelessly transmit electrical power (e.g., via cabling layer 112) to the respective charging receiver 24 of one or more electric vehicles 20 traveling (e.g., driving in a continuous motion) along wireless charging travel lane 10. Accordingly, system 100 may be configured to provide fast charging of one or more (e.g. a plurality) electric vehicles 20 at relatively high voltages and/or electrical currents as electric vehicles 20 move relative to wireless charging travel lane(s) 10 at various suitable speeds. It should be appreciated that system 100 may be further configured to transmit electrical power to electric vehicles 20 as electric vehicles 20 are stationary (e.g., not driving in a continuous motion) relative to wireless charging travel lane 10, such as during occurrences of traffic and/or other incidents of ceased mobility.

Still referring to FIG. 3, each of the plurality of wireless charging pad assemblies 110 along wireless charging travel lane 10 may be electrically connected to a power station 130 of system 100, which may be in further electrical communication with one or more of an electrical substation 132 and an electrical grid 134. Electrical substation 132 and electrical grid 134 may be located upstream from power station 130, and at varying (distant) locations relative to wireless charging travel lane 10 and/or power station 130. Electrical substation 132 may define an electrical generation, transmission, and/or distribution system for supplying electrical power to system 100, such as at power station 130. Electrical grid 134 may define an interconnected network of synchronized power providers and/or control centers for delivering electricity, such as to one or more electrical substations 132.

The electrical connection of power station 130, electrical substation 132, and electrical grid 134 may collectively form a power delivery system for system 100. Electrical grid 134 may be operable to deliver electrical power to electrical substation 132, such as via one or more electrical utility lines 124. Electrical substation 132 may be operable to deliver said electrical power from electrical grid 134 to power station 130 via one or more electrical utility lines 124. Electrical utility lines 124 may be configured and operable like electric utility lines 120. Power station 130 may be operable to deliver said electrical power received from electrical substation 132 to the plurality of wireless charging pad assemblies 110 via a main electrical utility line 122 that is electrically coupled to a corresponding electrical utility line 120 of each of the plurality of wireless charging pad assemblies 110. Main electrical utility line 122 may be configured and operable like electric utility lines 120. By way of illustrative example only, main electrical utility line 122 may have various suitable electrical output, including but not limited to, an electrical output ranging from about 180 KW (kilowatts of electricity output per hour) to about 220 KW, such as about 200 KW. In other embodiments, main electrical utility line 122 may have an electrical output that is relatively greater and/or lesser than an electrical output of the plurality of electrical utility lines 120.

Still referring to FIG. 3, power station 130 of system 100 may be positioned adjacent to the plurality of charging pad assemblies 110. For example, power station 130 may be positioned adjacent to and outside of wireless charging travel lane 10, such as outside of shoulder 16. In other examples, power station 130 may be flush-mounted or embedded within the roadway surface, such as within wireless charging travel lane 10 and/or non-wireless charging travel lane 11. In the embodiment, power station 130 may include one or more inverters that are configured to receive power and generate, for example, an electromagnetic (EM) Alternating Current (AC) signal that is supplied to wireless charging pad assemblies 110 via main electrical utility line 122. By way of illustrative example only, power station 130 may have various suitable electrical outputs, including but not limited to, an electrical output ranging from about 180 KW to about 220 KW, such as about 200 KW. As described in detail above, cabling layer 112 may define a transmitter of charging pad assembly 110, such that cabling layer 112 may be configured to generate an EM field that wirelessly transmits the electromagnetic power outward from wireless charging travel lane 10 and towards a respective charging receiver 24 of the one or more electric vehicles 20 traveling along wireless charging travel lane 10.

In some embodiments, system 100 may be configured to continuously generate and wirelessly transmit electrical power from wireless charging travel lane 10. In other embodiments, system 100 may be configured to wirelessly transmit electrical power upon detecting (e.g., via one or more sensors of system 100) the presence of one or more electric vehicles 10 traveling on wireless charging travel lane 10. For example, the one or more sensors (not shown) of system 100 may be configured to detect a motion, a pressure, and/or a weight of electric vehicle(s) 20 traveling along wireless charging travel lane 10. In some embodiments, the one or more sensors may be coupled to, positioned adjacent to, and/or disposed in wireless charging pad assembly 110, such as, for example, in power electronics layer 116. In further embodiments, as electric vehicle 20 drives along wireless charging travel lane 10, control unit 22 and/or charging receiver 24 may be configured to detect when electric vehicle 20 is positioned adjacent to one or more of the plurality of wireless charging pad assemblies 110 located along wireless charging travel lane 10. Upon detection, control unit 22 and/or charging receiver 24 may be configured to transfer an electrical power received from wireless charging travel lane 10, and particularly wireless charging pad assembly 110, to rechargeable battery 26 as electric vehicle 20 is in motion.

In some embodiments, the wireless electric charging capabilities provided by system 100 at wireless charging travel lane 10 may be accessed and/or controlled through a software application. The software application may be stored on and/or in communication with control unit 22, and may be programmed to identify and/or find available wireless charging travel lanes 10 along a desired route of travel. The software application may facilitating a navigation of electric vehicle 20 on wireless charging travel lane(s) 10 and/or an alignment of electric vehicle 20 in a suitable position relative to wireless charging travel lane(s) 10 for charging.

Still referring to FIG. 3, it should be understood that system 100 may be configured and operable for unidirectional wireless application of electrical power transfer from electrical grid 134 to electric vehicle 20, via electric substation 132 and power station 130 disposed therebetween. In other embodiments, power station 130 may be configured to receive electrical power from one or more of the plurality of wireless charging pad assemblies 110, in addition to electrical substation 132 and electrical grid 134. In this embodiment, system 100 may be configured and operable for bi-directional wireless application of electrical power transfer between electrical grid 134 to electric vehicle 20. Accordingly, an electrical charge stored in rechargeable battery 26 of the one or more electric vehicles 20 driving along wireless charging travel lane 10 may be transmitted to the one or more wireless charging pad assemblies 110 for conveyance and receipt by electrical substation 132 and/or electrical grid 134. In other words, wireless charging pad assemblies 110 may provide electrical power (received from electric vehicles 20) to electrical substation 132 and/or electrical grid 134 (e.g., for use by a surrounding region serviced by electrical substation 132 and/or electrical grid 134), and electrical substation 132 and/or electrical grid 134 may provide electrical power to wireless charging pad assemblies 110.

Referring now to FIG. 4, another exemplary wireless charging system 200 (hereinafter "system 200") is shown. It should be appreciated that system 200 may be configured and operable like system 100 shown and described above except for the differences explicitly noted herein. Accordingly, like reference numerals are used to identify like components. As shown in FIG. 4, system 200 may include a plurality of wireless charging pad assemblies 110 positioned along wireless charging travel lane 10, each of which may be electrically connected to at least one rechargeable battery 126 via a respective electric utility line 120. In the example, rechargeable batteries 126 may be positioned adjacent to wireless charging travel lane 10 and disposed in-ground (e.g., beneath a ground surface), such as outside of shoulder 16. Accordingly, each rechargeable battery 126 may not be visible from the roadway. It should be understood that rechargeable batteries 126 may be positioned along various other locations relative to wireless charging travel lane 10 without departing from a scope of this disclosure.

System 200 may include an onsite charging depot 128 positioned relatively adjacent to wireless charging travel lane 10. In some embodiments, onsite charging depot 128 may be positioned adjacent to and outside of wireless charging travel lane 10, such as near shoulder 16. Each rechargeable battery 126 may be electrically coupled to onsite charging depot 128 via main electric utility line 122. Onsite charging depot 128 may include one or more charging pads (e.g., receivers and/or transmitters) configured to receive electrical power from one or more power sources, such as a mobile power station 30. By way of illustrative example only, onsite charging depot 128 may have various suitable electrical outputs, including but not limited to, an electrical output ranging from about 180 KW to about 220 KW, such as about 200 KW. As described herein, onsite charging depot 128 may be capable of providing bidirectional wireless charging between rechargeable batteries 126 and one or more power sources, such as mobile power station 30. In some embodiments, system 200 may include a power station electrically coupled to onsite charging depot 128.

Still referring to FIG. 4, mobile power station 30 may include one or more (rechargeable) batteries 32 and at least one charging unit 34. The one or more batteries 32 may be configured to store electrical power onboard mobile power station 30. In one embodiment, batteries 32 may be charged with electrical power received from an off-site power source, such as a recharging depot that is electrically coupled to one or more of electrical substation 132 and/or electrical grid 134 (see FIG. 3). Charging unit 34 may be configured to transmit the electrical power stored in the one or more batteries 32 to onsite charging depot 128, such as in response to mobile power station 30 (and particularly charging unit 34) electrically coupling with onsite charging depot 128.

For example, mobile power station 30 may include a vehicle that is capable of being positioned adjacent to (e.g., driven over) onsite charging depot 128. Onsite charging depot 128 may be configured and operable to receive the electrical power stored in batteries 32 upon charging unit 34 aligning with (or being positioned adjacent to) onsite charging depot 128. Onsite charging depot 128 may be configured and operable to wirelessly receive the electrical power from mobile power station 30, while in other embodiments onsite charging depot 128 may be configured to establish a wired connection with mobile power station 30.

Still referring to FIG. 4, charging unit 34 may define a transmitter of mobile power station 30, and onsite charging depot 128 may define a receiver of system 200. In this instance, charging unit 34 may have an electrical output ranging from about 1 MWh (megawatts of electricity transmitted per hour) to about 5 MWh. Although one onsite charging depot 128 and one mobile power station 30 are shown and described herein, it should be appreciated that system 200 may include additional onsite charging depots 128 without departing from a scope of this disclosure. Additionally and/or alternatively, onsite charging depot 128 may be configured and operable to simultaneously establish an electrical communication with a plurality of mobile power stations 30.

Upon onsite charging depot 128 receiving the electrical power from mobile power station 30 via (wireless) connection with charging unit 34, onsite charging depot 128 may be configured to transmit the electrical power to one or more of rechargeable batteries 126 via main electric utility line 122. In some embodiments, onsite charging depot 128 may be configured and operable to distribute the electrical power via a predefined pattern, sequence, and/or arrangement. For example, onsite charging depot 128 may be configured to distribute the electrical power from mobile power station 30 equally between each of the plurality of rechargeable batteries 126 for use by each of the wireless charging pad assemblies 110 coupled thereto, respectively. By way of further example, onsite charging depot 128 may be configured to distribute the electrical power based on a current charge level of the plurality of rechargeable batteries 126, such that rechargeable batteries 126 with relatively less electrical power stored therein may receive greater charge from onsite charging depot 128.

Still referring to FIG. 4, the electrical power received at each rechargeable battery 126 may be transferred to the corresponding wireless charging pad assembly 110 electrically coupled thereto via the respective electric utility line 120. Accordingly, the plurality of electric vehicles 20 traveling along wireless charging travel lane 10 may continuously receive electrical power (e.g., charge) from the plurality of wireless charging pad assemblies 110 while driving along wireless charging travel lane 10 using the power received from mobile power station 30. In some embodiments, mobile power station 30 may routinely (e.g., periodically) deliver electrical power to system 200 via onsite charging depot 128 to continuously supply electrical power to wireless charging pad assemblies 110.

It should be appreciated that each wireless charging pad assembly 110 may continuously draw electrical power from the corresponding rechargeable battery 126 for use in charging the plurality of electric vehicles 20 traveling along wireless charging travel lane 10. In instances where rechargeable battery 126 does not contain a suitable amount of electrical power for transfer to electric vehicle(s) 20, said wireless charging pad assembly 110 may be rendered temporarily inoperable. In this instance, wireless charging pad assembly 110 may discontinue providing electrical power to electric vehicle(s) 20 at the segment of wireless charging travel lane 10 where said wireless charging pad assembly 10 is located.

In some embodiments, rechargeable battery 126 may be configured to receive electrical power from wireless charging pad assembly 110. In this instance, one or more of the plurality of rechargeable batteries 126 may transfer electrical power received from wireless charging pad assemblies
110, such as from rechargeable batteries 26 of electric
vehicles 20 traveling on wireless charging travel lane 10, to
onsite charging depot 128. The electrical power received at
onsite charging depot 128 may be collected and transferred
to mobile power station 30 upon charging unit 34 electrically
coupling with onsite charging depot 128, thereby recharging
the one or more batteries 32. The electrical power received
by batteries 32 may be transferred (via mobile power station
30) to one or more surrounding regions for distribution and
use. In this embodiment, system 200 may be configured and
operable for bidirectional charging. In other words, wireless
charging pad assembly 110, rechargeable battery 126, onsite
charging depot 128, and mobile power station 30 may
collectively form a charging network in which each component of system 200 may be capable of transferring and
receiving electrical power relative to one another.

Referring now to FIG. 5, another exemplary wireless
charging system 300 (hereinafter "system 300") is shown. It
should be appreciated that system 300 may be configured
and operable like systems 100, 200 shown and described
above except for the differences explicitly noted herein.
Accordingly, like reference numerals are used to identify
like components. As shown in FIG. 5, system 300 may
include a plurality of wireless charging pad assemblies 110 positioned along wireless charging travel lane 10 within a
maximum offset distance relative to one another. In the
example, each of the plurality of wireless charging pad
assemblies 110 may be in electrical (wireless) communica-
tion with one another. In other words, the plurality of wireless charging pad assemblies 110 may be electrically
(wirelessly) coupled to one another such that adjacent wire-
less charging pad assemblies 110 may wirelessly transmit
and receive electrical power from one another.

In the embodiment, wireless charging pad assemblies 110 may be positioned in close proximity to one another (e.g.,
the maximum offset distance), such that each of wireless
charging pad assemblies 110 may be positioned within a
respective EM field of one or more adjacent wireless charg-
ing pad assemblies 110. For example, the maximum offset
distance may range from about 1 inch to about 10 feet.
Accordingly, wireless charging pad assemblies 110 may be
configured for bidirectional charging between one another,
such as an Alternating Current (AC) to AC signal transmis-
sion. For example, each wireless charging pad assembly 110 may be configured and operable to transfer electrical power
to, and receive electrical power from, an adjacent wireless
charging pad assembly 110, such as a first wireless charging
pad assembly 110 located in a first lateral direction B, and
a second wireless charging pad assembly 110 located in a
second lateral direction B. The first lateral direction B is
opposite of the second lateral direction B such that first
wireless charging pad assembly 110 is located along an
opposing side of a particular wireless charging pad assembly
110 as second wireless charging pad assembly 110.

The plurality of wireless charging pad assemblies 110
may be electrically connected to onsite charging depot 128
via main electric utility line 122. In one example, at least one
wireless charging pad assembly 110 (e.g., a charging mod-
ule) may be positioned along wireless charging travel lane
10 at a predetermined spatial interval, such as about every 10
meters. By way of illustrative example, system 300 may
include about 160 charging modules (e.g., wireless charging
pad assemblies 110) within about a mile length of wireless
charging travel lane 10.

As described in detail above with respect to system 200,
onsite charging depot 128 may include one or more charging
pads configured to disperse an electrical charge received
from mobile power station 30 to the plurality of wireless
charging pad assemblies 110. In the example, onsite charg-
ing depot 128 may be electrically coupled to at least one of
the plurality of wireless charging pad assemblies 110 via
main electric utility line 122. In this instance, the electrical
power received from onsite charging depot 128 from mobile
power station 30 may be delivered to at least one wireless
charging pad assembly 110, and wirelessly distributed to the
remaining wireless charging pad assemblies 110 from the at
least one wireless charging pad assembly 110 via bidirec-
tional charging in one or more directions B. As described in
detail above, onsite charging depot 128 may be further
configured to receive electrical charge from the plurality of
wireless charging pad assemblies 110 for delivery to mobile
power station 30, such as the electrical power received at
wireless charging pad assemblies 110 from one or more
electric vehicles 20 traveling along wireless charging travel
lane 10.

The foregoing detailed description of the certain exem-
plary embodiments has been provided for the purpose of
explaining the principles of the invention and its practical
application, thereby enabling others skilled in the art to
understand the invention for various embodiments and with
various modifications as are suited to the particular use
contemplated. This description is not necessarily intended to
be exhaustive or to limit the invention to the precise embodi-
ments disclosed. Any of the embodiments and/or elements
disclosed herein may be combined with one another to form
various additional embodiments not specifically disclosed.
Accordingly, additional embodiments are possible and are
intended to be encompassed within this specification and the
scope of the appended claims. The specification describes
specific examples to accomplish a more general goal that
may be accomplished in another way.

We claim:
1. A wireless charging system comprising:
a plurality of wireless charging pads positioned along a
   roadway, each of the plurality of wireless charging pads
   define a transmitter that is configured to wirelessly
   transfer electrical power to a receiver of one or more
   electric vehicles as the one or more electric vehicles are
   in motion relative to the roadway; and
a power station disposed adjacent to the roadway, and
   communicatively coupled to each of the plurality of
   wireless charging pads, wherein the power station
   defines an inverter that is configured to transfer elec-
   trical power to the plurality of wireless charging pads
   from a power source;
wherein the plurality of wireless charging pads are col-
   lectively configured to wirelessly charge the one or
   more electric vehicles in response to the one or more
   electric vehicles moving along the roadway, such that
   the receivers of the one or more electric vehicles
   continuously receive the electrical power from the
   plurality of wireless charging pads as the electric
   vehicle moves on the roadway, and
wherein each of the plurality of wireless charging pads is
   configured to wirelessly transfer the electrical power
   between one another, such that an adjacent pair of the
   plurality of wireless charging pads is configured to
   electrically charge one another.
2. The wireless charging system of claim 1, wherein the
plurality of wireless charging pads are positioned within a
maximum distance relative to one another along the road-
way, such that the plurality of wireless charging pads are
collectively configured to continuously transfer the electri- cal power to the receiver of the one or more electric vehicles as the one or more vehicles move between the plurality of wireless charging pads.

3. The wireless charging system of claim 2, wherein the plurality of wireless charging pads are configured to wirelessly charge the one or more electric vehicles when the receiver of the one or more electric vehicles is positioned directly over at least one of the plurality of wireless charging pads.

4. The wireless charging system of claim 2, wherein the plurality of wireless charging pads are configured to wirelessly charge the one or more electric vehicles when the receiver of the one or more electric vehicles is positioned in between an adjacent pair of the plurality of wireless charging pads.

5. The wireless charging system of claim 1, wherein each of the plurality of wireless charging pads is configured to wirelessly transfer the electrical power in one or more directions.

6. The wireless charging system of claim 5, wherein each of the plurality of wireless charging pads is configured to wirelessly transfer the electrical power in a first direction that is emitted vertically upwards towards an outer surface of the roadway.

7. The wireless charging system of claim 6, wherein the plurality of wireless charging pads includes a first adjacent wireless charging pad, and each of the plurality of wireless charging pads is configured to wirelessly transfer the electrical power in a second direction that is emitted laterally outwards towards the first adjacent wireless charging pad.

8. The wireless charging system of claim 7, wherein the plurality of wireless charging pads includes a second adjacent wireless charging pad, and each of the plurality of wireless charging pads is configured to wirelessly transfer the electrical power in a third direction that is emitted laterally outwards towards the second adjacent wireless charging pad of the plurality of wireless charging pads.

9. The wireless charging system of claim 8, wherein the second direction is opposite of the third direction such that the first adjacent wireless charging pad is separated by the second adjacent wireless charging pad by at least one of the plurality of wireless charging pads.

10. The wireless charging system of claim 1, wherein the power station is configured to equally distribute the electrical power from the power source to each of the plurality of wireless charging pads.

11. The wireless charging system of claim 1, wherein the plurality of wireless charging pads are collectively configured to continuously transfer the electrical power wirelessly to the receiver of the one or more electric vehicles moving on the roadway while the one or more electric vehicles remain on the roadway.

12. The wireless charging system of claim 1, wherein the plurality of wireless charging pads are disposed beneath the roadway and positioned in a linear arrangement relative to a longitudinal length of the roadway.

13. The wireless charging system of claim 1, wherein the plurality of wireless charging pads are configured to collect a stored electrical power from the one or more electric vehicles moving along the roadway;

wherein the plurality of wireless charging pads are configured to transfer the stored electrical power to the power station.

14. A wireless charging system, comprising:

a first wireless charging pad and a second wireless charging pad positioned along a roadway adjacent to one another, the first wireless charging pad is configured to wirelessly transfer a first portion of electrical power to a receiver of a vehicle and the second wireless charging pad is configured to wirelessly transfer a second portion of electrical power to the receiver of the vehicle while the vehicle is in motion on the roadway and positioned adjacent to the first wireless charging pad and the second wireless charging pad;

a first rechargeable battery positioned adjacent to the roadway, the first rechargeable battery is electrically coupled to the first wireless charging pad;

a charging depot positioned adjacent to the roadway, the charging depot is electrically coupled to the first rechargeable battery;

wherein the charging depot is configured to receive the first portion of electrical power from a power source and transfer the first portion of electrical power to the first rechargeable battery, and the first rechargeable battery is configured to transfer the first portion of electrical power to the first wireless charging pad in response to the vehicle moving on the roadway and the receiver being positioned adjacent to the first wireless charging pad, and wherein the first wireless charging pad and the second wireless charging pad are configured to wirelessly charge one another.

15. The wireless charging system of claim 14, wherein the first rechargeable battery is configured to store the first portion of electrical power received from the power source via the charging depot.

16. The wireless charging system of claim 14, wherein the charging depot includes a charging pad, and the power source includes a mobile power station that is configured to electrically couple with the charging pad upon moving adjacent to the charging depot.

17. The wireless charging system of claim 14, further comprising:

a second rechargeable battery positioned adjacent to the roadway, the second rechargeable battery is electrically coupled to the second wireless charging pad and the charging depot;

wherein the charging depot is configured to receive the second portion of electrical power from the power source and transfer the second portion of electrical power to the second rechargeable battery for transfer to the second wireless charging pad in response to the vehicle moving on the roadway and the receiver being positioned adjacent to the second wireless charging pad.

18. The wireless charging system of claim 17, wherein the first wireless charging pad and the second wireless charging pad are electrically coupled to one another such that each of the first wireless charging pad and the second wireless charging pad is configured to wirelessly transfer electrical power to one another.

19. A method for wirelessly charging a vehicle, comprising:

wirelessly transferring, using a plurality of wireless charging pads positioned in alignment relative to one another along a roadway, electrical power towards a receiver of the vehicle while the vehicle is in motion along the roadway and when the receiver is positioned proximate to one or more of the plurality of wireless charging pads;

wirelessly charging, using the plurality of wireless charging pads, one or more of the plurality of wireless charging pads with electrical power from one or more adjacent wireless charging pads when an electrical charge of the one or more wireless charging pads is relatively lower than the electrical charge of the one or more adjacent wireless charging pads; and wirelessly transferring the electrical power from one wireless charging pad of the plurality of wireless charging pads to another wireless charging pad of the plurality of wireless charging pads, such that an adjacent pair of the plurality of wireless charging pads is configured to electrically charge one another.

\* \* \* \* \*